US008357044B2

(12) United States Patent
Ng et al.

(10) Patent No.: US 8,357,044 B2
(45) Date of Patent: Jan. 22, 2013

(54) REAL-TIME DISPLAY OF FANTASY SPORTS PLAYER TRANSACTION DATA

(75) Inventors: Brian Ng, Santa Monica, CA (US); Dean Nakabayashi, Santa Monica, CA (US); Scott Pitkin, Los Angeles, CA (US); Sean Montgomery, Palo Alto, CA (US); Mark Kawakami, Burbank, CA (US); Ron Belmarch, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 894 days.

(21) Appl. No.: 11/959,378

(22) Filed: Dec. 18, 2007

(65) Prior Publication Data

US 2009/0156311 A1    Jun. 18, 2009

(51) Int. Cl.
*A63F 13/00* (2006.01)
(52) U.S. Cl. ............... 463/42; 463/1; 463/4; 463/9
(58) Field of Classification Search .............. 463/42
See application file for complete search history.

(56) References Cited

U.S. PATENT DOCUMENTS

| | | | |
|---|---|---|---|
| 5,636,920 A | 6/1997 | Shur et al. | |
| 5,971,854 A | 10/1999 | Pearson et al. | |
| 6,041,266 A | 3/2000 | Nickerson | |
| 6,193,610 B1 | 2/2001 | Junkin | |
| 6,371,855 B1 * | 4/2002 | Gavriloff | 463/42 |
| 6,656,042 B2 | 12/2003 | Reiss et al. | |
| D491,956 S | 6/2004 | Ombao et al. | |
| D499,740 S | 12/2004 | Ombao et al. | |
| D510,362 S | 10/2005 | Minagawa et al. | |
| D538,295 S | 3/2007 | Noviello et al. | |
| D538,815 S | 3/2007 | Noviello et al. | |
| D538,816 S | 3/2007 | Noviello et al. | |
| D538,817 S | 3/2007 | Noviello et al. | |
| D538,818 S | 3/2007 | Noviello et al. | |
| D549,717 S | 8/2007 | Noviello et al. | |
| D550,233 S | 9/2007 | Vigesaa | |
| D550,241 S | 9/2007 | Viegers et al. | |
| D551,675 S | 9/2007 | Noviello et al. | |
| D554,653 S | 11/2007 | Noviello et al. | |
| D557,702 S | 12/2007 | Viegers et al. | |
| D558,213 S | 12/2007 | Noviello et al. | |
| D559,259 S | 1/2008 | Noviello et al. | |
| D559,260 S | 1/2008 | Noviello et al. | |
| D569,869 S | 5/2008 | Chotai et al. | |

(Continued)

OTHER PUBLICATIONS

"ESPN FFL 2007" <http://web.archive.org/web/20070913135338/http://games.espn.go.com/ffl/addeddropped?slotCategoryId=17> (hereinafter as ESPN).*

(Continued)

*Primary Examiner* — Paul A. D'Agostino
*Assistant Examiner* — Ankit Doshi
(74) *Attorney, Agent, or Firm* — James J. DeCarlo; Greenberg Traurig, LLP

(57) ABSTRACT

An apparatus and method for providing up-to-date statistical information about fantasy sports players is disclosed herein. The volume and type of transactions made by a plurality of users regarding the fantasy sports players are used to generate at least one statistical value for respective players. The statistical values for respective players are provided in an online interface, providing ease of viewing of transaction activity regarding the players and/or facilitating a user's next transactions relative to the transaction activity of the plurality of users.

27 Claims, 4 Drawing Sheets

U.S. PATENT DOCUMENTS

| | | | |
|---|---|---|---|
| D571,373 S | | 6/2008 | Loehr et al. |
| D572,717 S | | 7/2008 | Loehr et al. |
| D579,943 S | | 11/2008 | Clark et al. |
| D594,012 S | | 6/2009 | Ng et al. |
| D594,464 S | | 6/2009 | Ng et al. |
| 7,618,312 | B1 * | 11/2009 | Kasten ............... 463/7 |
| 2001/0034734 | A1 | 10/2001 | Whitley et al. |
| 2002/0040253 | A1 | 4/2002 | McNally et al. |
| 2002/0107073 | A1 | 8/2002 | Binney |
| 2005/0164792 | A1 | 7/2005 | Wilcock |
| 2005/0228780 | A1 | 10/2005 | Diab et al. |
| 2006/0183548 | A1 | 8/2006 | Morris et al. |
| 2006/0217198 | A1 | 9/2006 | Johnson |
| 2006/0258421 | A1 * | 11/2006 | Nicholas et al. ........... 463/4 |
| 2007/0021165 | A1 | 1/2007 | Ma et al. |
| 2007/0060325 | A1 | 3/2007 | Gradek |
| 2007/0185599 | A1 | 8/2007 | Robinson et al. |
| 2007/0203591 | A1 * | 8/2007 | Bowerman ............ 700/90 |
| 2007/0243917 | A1 | 10/2007 | Wojewoda et al. |
| 2007/0243918 | A1 | 10/2007 | Wojewoda et al. |
| 2008/0026804 | A1 | 1/2008 | Baray et al. |
| 2008/0033840 | A1 | 2/2008 | Upendran et al. |
| 2008/0096664 | A1 | 4/2008 | Baray et al. |
| 2008/0102911 | A1 | 5/2008 | Campbell et al. |
| 2008/0147575 | A1 | 6/2008 | Roy |
| 2008/0153589 | A1 | 6/2008 | Baray et al. |
| 2008/0155436 | A1 | 6/2008 | Hirano et al. |
| 2008/0161113 | A1 * | 7/2008 | Hansen et al. ........... 463/42 |
| 2009/0156312 | A1 | 6/2009 | Ng et al. |

OTHER PUBLICATIONS

Anonymous. (2000). Y! Sports Screen Shot of Fantasy Baseball Home Page, 1 page.

Anonymous. (Sep. 29, 2004). Y! Sports (ID#101) GMC Fantasy Baseball Plus Screen Shot, 1 page.

Non-Final Office Action mailed on Dec. 12, 2007, for U.S. Appl. No. 11/406,663, 7 pages.

Non-Final Office Action mailed on Jun. 17, 2009, for U.S. Appl. No. 11/406,663, eight pages.

TurboStats Software Company. (Mar. 6, 2001). "Drag & Drop Field Layout," <http://web.archive.org/web/200010418220420/http://www.turbostats.com/baseline.htm>, last visited on Jun. 11, 2009, three pages.

Waybackmachine. (Jun. 11, 2009). "Internet Archive WayBack Machine, <http://web.archive.org/web/*/http://www.turbostats.com/baseline.htm>," last visited on Jun. 11, 2009, one page.

Non-Final Office Action for U.S. Appl. No. 11/406,663, mailed Jan. 24, 2011.

Final Office Action for U.S. Appl. No. 11/406,663, mailed Oct. 13, 2010.

Non-Final Office Action for U.S. Appl. No. 11/406,663, mailed May 27, 2010.

Advisory Action for U.S. Appl. No. 11/406,663, mailed Mar. 1, 2010.

Final Office Action for U.S. Appl. No. 11/406,663, mailed Dec. 15, 2009.

Final Office Action for U.S. Appl. No. 11/406,663, mailed Jan. 12, 2009.

Non-Final Office Action for U.S. Appl. No. 11/603,496, mailed Feb. 1, 2011.

Final Office Action for U.S. Appl. No. 11/603,496, mailed Nov. 26, 2010.

Non-Final Office Action for U.S. Appl. No. 11/603,496, mailed Aug. 6, 2010.

Final Office Action for U.S. Appl. No. 11/603,496, mailed Jun. 16, 2010.

Non-Final Office Action for U.S. Appl. No. 11/603,496, mailed Dec. 23, 2009.

* cited by examiner

REAL-TIME DISPLAY OF FANTASY SPORTS PLAYER TRANSACTION DATA

BACKGROUND

1. Field

The present application relates generally to online fantasy sports games, and more particularly to an interface for displaying information about players in online fantasy sports games.

2. Related Art

In online fantasy sports games, such as fantasy football, baseball, hockey, golf, and automobile racing, a user can create a fantasy team. The fantasy team includes fantasy players that are based upon real-life players. The user's fantasy team may compete against fantasy teams of other users. An online fantasy sports game typically includes a player selection phase followed by a game play phase. Ordinarily, the player selection phase occurs between real-life games, and the game play phase occurs during real-life games. The game play phase typically occurs on game days, which are days on which real-life sports games are played. Statistics of players in the real-life games, such as points scored by each of the players, are used to determine the winners of the online fantasy games. The users of online fantasy sports games are typically users of an online service.

The users may access the fantasy sports games via a computer-based interface, such as a Web site. In the games, each fantasy player typically corresponds to a real-life sports player, and the fantasy player may have the same name and statistics as a real-life sports player. The statistics may include an average number of points scored per game and other measures of performance. A user chooses a limited number of players for a team with the goal of creating a team that will score the most points. The points scored by a fantasy team are ordinarily calculated as the sum of the fantasy points scored in a real-life game by the real-life players corresponding to the active fantasy players on the team. Therefore each fantasy player scores fantasy points on the same day as a corresponding real-life game.

To make good decisions about which players to add and play for their fantasy teams, users should be able to quickly access statistical information about the sports players. Therefore it would be desirable to present statistical information in a format that informs the user of statistical trends related to fantasy sports players at a glance.

BRIEF SUMMARY

One aspect of the invention comprises an interface for displaying player trends in an online fantasy sports game is provided. The interface includes at least one player description component that displays a name of a fantasy sports player, and at least one player information indicator for displaying an indication of a statistical value associated with the fantasy sports player. The interface is operable to periodically refresh the indication of the statistical value to display a recent value of the statistical value.

Another aspect of the invention comprises an interface for displaying player trends in an online fantasy sports game is provided. The interface includes a player table comprising at least one row and at least one column. The at least one row represents a corresponding fantasy sports player. The at least one column includes a player description column for displaying a description of the fantasy sports player, the description including a name of the fantasy sports player, and at least one player information indicator for displaying a representation of a statistical value associated with the fantasy sports player. The interface is operable to periodically refresh the representation of the statistical value to display a recent value of the statistical value.

Still another aspect of the invention comprises a computer enabled method for providing player trends for online fantasy sports games. The method includes tracking transactions made by a plurality of users regarding at least one fantasy sports player, and generating a statistical value for the fantasy sports player based on the tracked transactions. The method further includes displaying a player identifier and a representation of the statistical value for the fantasy sports player, and dynamically updating the representation of the statistical value based on real-time transactions made by the plurality of users.

Still another aspect of the invention relates to a computer program product comprising program code for providing information about fantasy sports players. The computer program product comprises program code for generating a first statistical value associated with a fantasy sports player, presenting an identifier of the fantasy sports player and the first statistical value, and updating the first statistical value in real-time.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
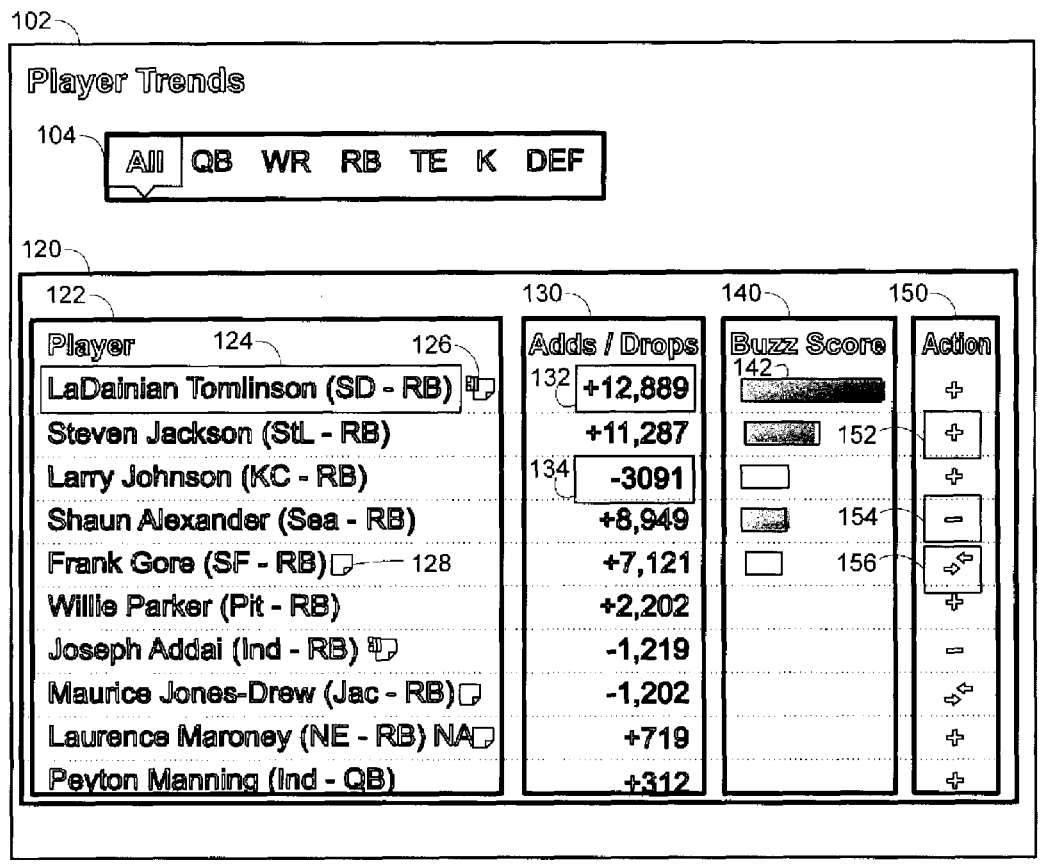
FIGS. 1A and 1B illustrate a user interface for displaying fantasy sports player trends in accordance with embodiments of the invention.
Figure 1B:
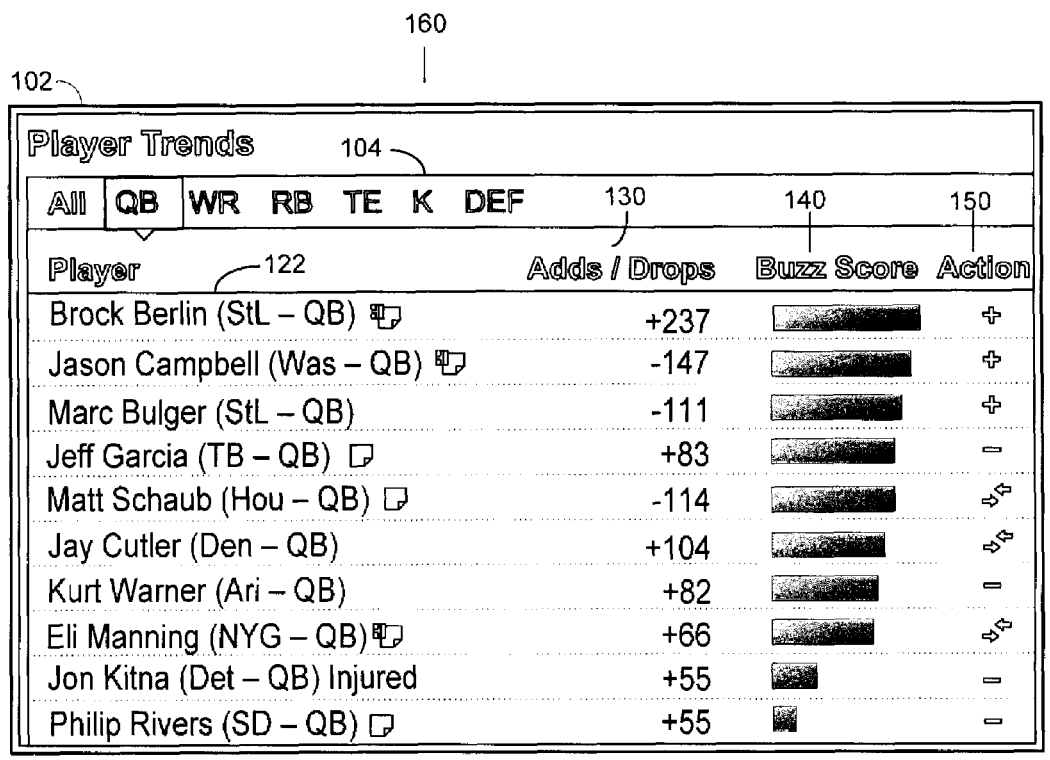

FIGS. 1A and 1B illustrate a user interface for displaying fantasy sports player trends in accordance with embodiments of the invention.

A player trends user interface 102 illustrates the volume of transactions executed by multiple users for particular players. If the volume of requests to add a player to teams is high, then a user knows that the player must be a good player, or at least a popular player. Similarly, if the volume of requests to drop a player from teams is high, then the player is probably not doing well, or at least unpopular. This information, displayed in a form that can be read quickly, is useful to fantasy sports users because it assists them in deciding which players to add to and/or drop from their fantasy sports team.

The player trends user interface 102 includes a player type selector 104, a player table 120, a player column 122, an add/drop column 130, a buzz score column 140, and an action column 150.

The player type selector 104 comprises a plurality of tabs, one tab for each of the different types of players. The players can be grouped by their positions in their actual sport teams. As an example, for football, the players can be grouped as: all football players ("All" tab), quarterbacks ("QB" tab), wide receivers ("WR" tab), running backs ("RB" tab), tight end ("TE" tab), kickers ("K" tab), and defense ("DEF" tab). In FIG. 1A, the "All" tab is selected and accordingly, the player table 120 provides information about all football players. Alternatively, if the "QB" tab is selected (as in FIG. 1B), the player table 120 would provide information about quarterbacks only.

The player table 120 includes the player column 122, add/drop column 130, buzz score column 140, and action column 150. The player column 122 provides a list of players (for the selected player type) having the highest added or dropped scores. The list may be further ordered from highest to lowest buzz scores. The list comprises a predetermined number of players, for example, ten, fifteen, or twenty players. Alternatively, all the players for the selected player type may be displayed.

Each row in the player table 120 corresponds to a listed player. In the player column 122, each row displays a player description component 124, an injury status component, and a note component. The player description component 124 (also referred to as a player description row, icon, or link) comprises a player name (e.g., "LaDainian Tomlinson"), the player's actual sport team name or location (e.g., "SD" for San Diego), and the player's actual position in his sports team (e.g., "RB" for running back). The injury status component, not shown in FIG. 1A, provides a description or code of the player's injury if the player is currently injured. The injury status component may be optional depending on, for example, the amount of space available for the player table 120. The note component is included for a particular player if there is relatively new statistical information about the player (e.g., the player's actual statistic changed due to the player's performance in actual games). The note component comprises a visual representation of a note (or any other visual indication). The note component can be a first note component 126, which indicates that at least one new (statistical) information about the player is available today, or a second note component 128, which indicates that at least new (statistical) information about the player has been available for the past couple of days. As shown in FIG. 1A, the first and second note components 126, 128 are displayed only when appropriate. Player Steven Jackson, for example, has no note component because there is no change in his information.

Each of the player description component 124, the first note component 126, and the second note component 128 is a link to a respective player's page. When a user clicks on any of the player description component 124, first note component 126, or second note component 128 for a particular player, a new page is provided in a new window. The new page comprises a web page of the respective player information, including, but not limited to, the player's photo, career statistics, commentary regarding the player, etc. (also referred to as the player information page). Each player has a separate player information page. The user's selection of either the first or second note components 126, 128 may open the player information page at a particular location or subsection, e.g., at the location where the new information is being provided.

The add/drop column 130 provides an add or drop score for each of the players listed in the player column 122. The add or drop scores reflect the real-time volume of add/drop transactions made by all of the users for the current day. Alternatively, the scores may reflect the volume for some other predefined time period.

A positive or added score 132 includes a plus sign and may be displayed in a different color, font, bolded, or other visual effect to distinguish from a negative or dropped score 134. For example, added score 132 may be in green and the dropped score 134 may be in red. The dropped score 134 includes a negative sign. The added score 132 indicates the number of times a particular player has been added to any team in the user's fantasy sports league (the add count is also referred to as a statistical value). The dropped score 134 indicates the number of times a particular player has been dropped from any team in the user's fantasy sports league. If a particular player was added by some users and dropped by other users, the player's score would be the net sum of the adds and drops, and the final score could be a positive or negative score.

The buzz score column 140 provides a buzz score for one or more of the players listed in the player column 122. A buzz score 142 (also referred to as a buzz score rendition), which is illustrated as a bar group in FIG. 1A, is based on a buzz count. The buzz count is the sum of the number of times a particular player has been added, dropped, and traded from teams in the user's fantasy sports league. The time period captured by the buzz score 142 is similar to the time period for the add/drop column 130. Thus, the buzz score column 140 is an alternative indicator (perhaps an easier visual indication) of the level of transaction volume for particular players.

The action column 150 is optional and is provided if the user is logged in (e.g., the system can uniquely identify the user by, for example, the user entered user name and password) and the user has a fantasy sports team. If the user assessing the player table 102 is not logged in or the user is currently logged in but does not have a fantasy sports team, then the action column 150 is generally not displayed.

The action column 150 provides suggestions for add, drop, or trade transactions that can be made by the user with respect to each of the listed players for the user's particular fantasy sports team. Each of an add action component or icon 152, drop action component or icon 154, and a trade action component or icon 156 is an actionable component for performing operations on fantasy sport players listed in the player table 120. Only one of the components 152, 154, or 156 is provided for each player listed in the player table 120. The component 152, 154, or 156 is suggested for each player taking into account the player rosters of all the users' teams participating in the fantasy sports league. For example, the drop component 154 is suggested for player Shaun Alexander for a particular user because this player is already on the particular user's team, and thus this player cannot be added again to the particular user's team (e.g., the add component 152 would not be appropriate). As another example, the add component 152 is displayed for player Steven Jackson for a particular user because this player is currently not on the particular user's team nor is this player owned by any other users' teams. Thus, Steven Jackson can be added to the particular user's team.

The add action component 152 is a visual presentation of an add action, such as a plus sign. The drop action component 154 is a visual presentation of a drop action, such as a minus sign. The trade action component 156 is a visual presentation of a trade action, such as a pair of arrows pointing in opposite directions. When the user clicks on any of the components 152, 154, 156, a new window is opened to a respective in-game page. The in-game page is configured to allow the user to add/drop/trade the respective player from his or her fantasy sports team. For example, if the user clicked on the add action component 152, the user is presented with a new page that allows the user to add player Steven Jackson to the user's team.

If the user has more than one fantasy sports team and/or fantasy league, then the action column 150 reflects the team and/or league specified by the user. When the user subsequently chooses a different team, the action column 150 refreshes to reflect the newly selected team. Furthermore, if an add, drop, nor trade action applies to a particular player listed in the player column 122 for the user, then a fourth component or icon may be provided to indicate this fourth status for such player(s).

In alternative embodiments, the add/drop column 130 and/or buzz score column 140 may be optional for logged in or not logged in users.

The player trends user interface 102 can comprise a web page or a section within a web page that includes other visual and textual information, such as a live broadcast feed. The information provided by the player trends user interface 102 is updated dynamically, in real-time, or periodically (such as every five or ten minutes). The information can be updated by refreshing the entire page or user interface, or by only refreshing the information item that requires updating (in-page refreshes). In any case, the dynamic updating of information is similar to real-time stock quotes or finance ticker tapes. For example the added score 132, dropped score 134, and/or the buzz score 142 made require real-time updates.

FIG. 1B illustrates another tab of the player trends user interface 102, in particular the quarterbacks tab selected from the player type selector 104. A player table 160 includes the player column 122, add/drop column 130, buzz score column 140, and action column 150 as similarly discussed above. The players listed in the player column 122 are all quarterbacks because the user specified the "QB" tab.

It is contemplated that the player trends user interface 102 can be configured for a variety of sports, even sports that may not have position names for its players. Examples of possible sports include, but are not limited to, football, baseball, basketball, hockey, golf, tennis, automobile racing, and softball.

Figure 2:
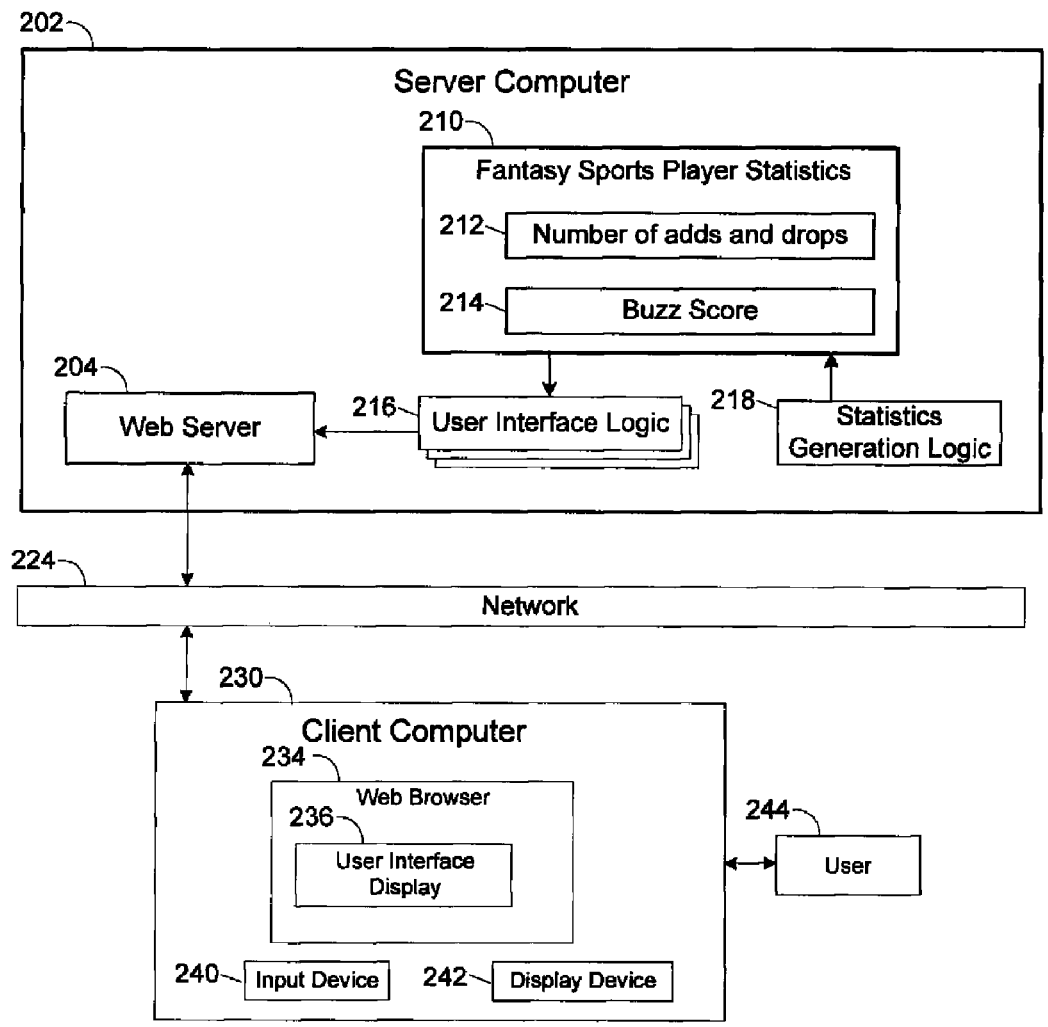
FIG. 2 illustrates a World Wide Web-based system for providing a fantasy sports player trends user interface in accordance with embodiments of the invention.

FIG. 2 illustrates a World Wide Web-based system for providing a fantasy sports player trends user interface in accordance with embodiments of the invention. The system comprises a server 202, a network 224, a client 230, and a user 244. Each of the server 202 and the client 230 is coupled to the network 224. The user 244 interacts with the client 230.

The server 202 (also referred to as a server computer) comprises a web server 204, a fantasy sports player statistics logic (unit) 210, a user interface logic (unit) 216, and a statistics generation logic (unit) 218. The fantasy sports player statistics 210 is in communication with each of the user interface logic 216 and the statistics generation logic 218. The user interface logic 216 is in communication with the web server 204. The web server 204 communicates with the network 224.

The server 202 comprises one or more host servers operable to provide content, the player trends user interface 102, web pages, and/or web-based applications to the client 230 via the network 224. Although not shown, the server 202 can include one or more servers, databases, routers, processors, switches, interfaces, and/or other modules in a distributed environment to provide the player trends user interface 102 to the client 230.

Each of the web server 204, fantasy sports player statistics 210, user interface logic 216, and statistics generation logic 218 can comprise hardware, software, and/or firmware.

The web server 204 interacts with the client device, e.g., by providing logic through which the client can communicate with the user interface logic 216 via, for example, HyperTest Transport Protocol (HTTP) and HyperText Markup Language (HTML) data sent via the network 224, which may be, for example, the Internet. In one example, web server 204 executes on the server computer 202 to receive HTTP requests from the client computer 230 via the network 224. The web server logic 204 makes the HTTP requests available to the user interface logic 216 as input. Output produced by the user interface logic 216, e.g., a user interface display created in response to an HTTP request, is sent by the web server 204 as an HTTP response to the client 230 via the network 224. In other examples, the communication between the client and the server may be implemented by other protocols, known to those skilled in the art, such as XmlHttpRequest, Adobe® Flash®, or the like. The server logic such as the user interface logic 216 and statistics generation logic 218 may be implemented as computer program code in a programming language such as JavaScript™, Adobe® Flash®, Java®, or the like. The server logic may provide user interface components, e.g., HTML pages, JavaScript™ components, widgets implemented in JavaScript™ or another programming language. In one aspect, the user interface logic 216 may provide the specific user interfaces, including components such as text, maps, buttons, input fields, and widgets. The user interface logic 216 may transmit the user interfaces via the web server 204 to the client application or browser located on the client 230. As the user 244 interacts with the user interface components 236 on the client 230, input data received from the user 244 may be transmitted from the client 230 to the server computer 202 via the web server 204.

The statistics generation logic 218 and the fantasy sports player statistics logic 210 are operable to track, calculate, and maintain the add, drop, trade, and buzz counts for each player in the fantasy sport leagues. Other data regarding the players, the player information pages, and the users' selections are also known by the statistics generation logic 218 and/or fantasy sports player statistics 210. All of the data necessary to configure the player trends user interface 102 and to handle the user's interaction responses to the interface 102 are accounted for in the fantasy sports player statistics logic 210. As shown, the fantasy player statistics logic 210 includes, among other things, the number of adds and drops for each player 212 and the buzz score for each player 214.

When the user 244 provides appropriate input via an input device 240 included in the client 230, the user interface logic 216 is operable to generate the player trends user interface 102 by retrieving the appropriate data (at least from the fantasy sports player statistics logic 210), formatting the data into a table, sorting the table, adding user interface components, and transmitting the player trends user interface 102 to the client 230, via the web server 204 and the network 224.

The client 230 (also referred to as a client computer) includes a web browser 234, the input device 240, and a display device 242. The player trends user interface 102 data is received from the server 202 for display at the display device 242. The player trends user interface 102 data is received by the web browser 234 (or other application environment appropriate to handle the player trends user interface 102 data), and the web browser 234, in turn, includes a user interface display 236 to handle the display of the player trends user interface 102. When the user 244 interacts with the displayed player trends user interface 102, for example, clicking on a particular player name, such command is transmitted from the input device 240 to the network 224 and to the web server 204 to cause new content to be configured by the user interface logic 216 and returned to the client 230.

The web browser 234 can be any of a variety of browser applications such as Internet Explorer or Firefox. Alternatively, the web browser 234 may not be required at the client 230 if the data associated with the player trends user interface 102 includes logic and components to sufficient to direct presentation of the player trends user interface 102 at the client 230.

The network 224 comprises a communications network, such as a local area network (LAN), wide area network (WAN), or the Internet. The network 224 can be a private or public network.

The client 230 can be a variety of computing devices, including mobile or wireless devices. There may be a plurality of client computers receiving the player trends user interface 102 from the server 202. The server 202, or at least certain portions such as the user interface logic 216 and web server 204, may be provided in more than one location depending on computation and/or distribution requirements. In order to provide dynamic updates of the data displayed in the player trends user interface 102, the statistics generation logic 218 continually (or nearly continually) tracks and calculates player statistics based on the transactions (e.g., adds, drops, and trades) of the plurality of users participating in the fantasy sport league for the predetermined period of time (such as all of the users' actions during the current day).

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 3:
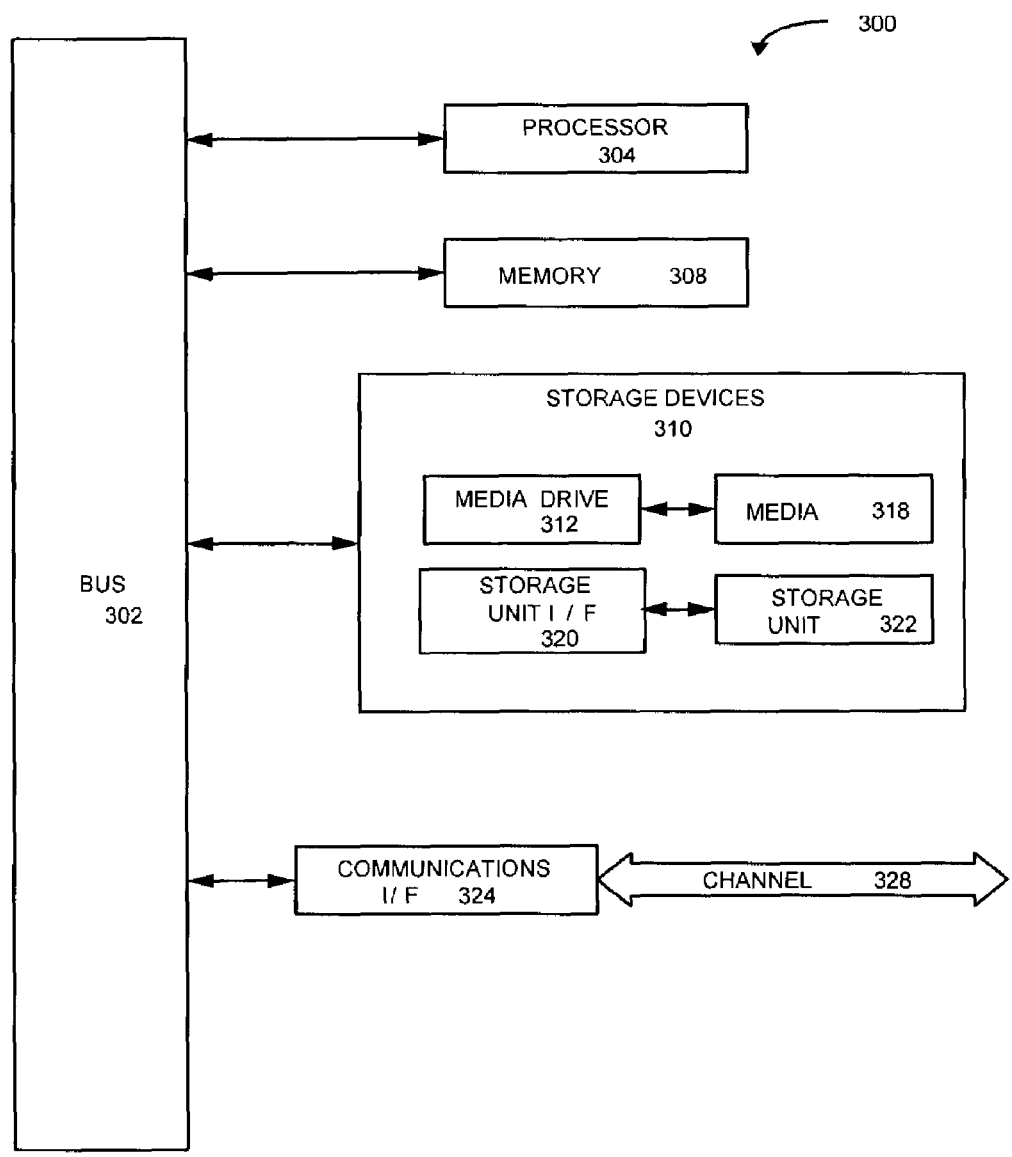
FIG. 3 illustrates a computing system that may be employed to implement processing functionalities in accordance with embodiments of the invention.

FIG. 3 illustrates a typical computing system 300 that may be employed to implement processing functionality in embodiments of the invention. Computing systems of this type may be used in clients and servers, for example. Those skilled in the relevant art will also recognize how to implement the invention using other computer systems or architectures. Computing system 300 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 300 can include one or more processors, such as a processor 304. Processor 304 can be implemented using a general or special purpose processing engine such as, for example, a microprocessor, microcontroller or other control logic. In this example, processor 304 is connected to a bus 302 or other communication medium.

Computing system 300 can also include a main memory 308, such as random access memory (RAM) or other dynamic memory, for storing information and instructions to be executed by processor 304. Main memory 308 also may be used for storing temporary variables or other intermediate information during execution of instructions to be executed by processor 304. Computing system 300 may likewise include a read only memory (ROM) or other static storage device coupled to bus 302 for storing static information and instructions for processor 304.

The computing system 300 may also include information storage system 310, which may include, for example, a media drive 312 and a removable storage interface 320. The media drive 312 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 318, may include, for example, a hard disk, floppy disk, magnetic tape, optical disk, CD or DVD, or other fixed or removable medium that is read by and written to by media drive 314. As these examples illustrate, the storage media 318 may include a computer-readable storage medium having stored therein particular computer software or data.

In alternative embodiments, information storage system 310 may include other similar components for allowing computer programs or other instructions or data to be loaded into computing system 300. Such components may include, for example, a removable storage unit 322 and an interface 320, such as a program cartridge and cartridge interface, a removable memory (for example, a flash memory or other removable memory module) and memory slot, and other removable storage units 322 and interfaces 320 that allow software and data to be transferred from the removable storage unit 318 to computing system 300.

Computing system 300 can also include a communications interface 324. Communications interface 324 can be used to allow software and data to be transferred between computing system 300 and external devices. Examples of communications interface 324 can include a modem, a network interface (such as an Ethernet or other NIC card), a communications port (such as for example, a USB port), a PCMCIA slot and card, etc. Software and data transferred via communications interface 324 are in the form of signals which can be electronic, electromagnetic, optical or other signals capable of being received by communications interface 324. These signals are provided to communications interface 324 via a channel 328. This channel 328 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium," and the like may be used generally to refer to media such as, for example, memory 308, storage device 318, or storage unit 322. These and other forms of computer-readable media may be involved in storing one or more instructions for use by processor 304, to cause the processor to perform specified operations. Such instructions, generally referred to as "computer program code" (which may be grouped in the form of computer programs or other groupings), when executed, enable the computing system 300 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 300 using, for example, removable storage drive 314, drive 312 or communications interface 324. The control logic (in this example, software instructions or computer program code), when executed by the processor 304, causes the processor 304 to perform the functions of the invention as described herein.

It will be appreciated that, for clarity purposes, the above description described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A computing device comprising:
a processor;
a display in communication with the processor for displaying an interface comprising player trends in an online fantasy sports game, the interface comprising:
at least one player description component that displays a name of a fantasy sports player;
at least one player information indicator for displaying an indication of a statistical value associated with the fantasy sports player, the statistical value based on a number of times the fantasy sports player has been added to and dropped from fantasy sports teams in the fantasy sports game,
wherein the indication includes a plus sign when the statistical value comprises a net addition of the fantasy sports player to the fantasy sports teams, and the indication includes a minus sign when the statistical value comprises a net drop of the fantasy sports player from the fantasy sports teams; and
an action component for and displayed adjacent to the name of the fantasy sports player, wherein the action component comprises an icon that represents an action to be performed with respect to the fantasy sports player, and the action component causes the action to be performed in response to user selection of the action component,
wherein the interface periodically refreshes the indication of the statistical value to display a recent value of the statistical value.

2. The computing device of claim 1, wherein the statistical value corresponds to a time interval.

3. The computing device of claim 2, wherein the time interval is one day.

4. The computing device of claim 1, wherein the interface displays the at least one player description component in a sorted order, wherein the sorted order is based on the statistical value.

5. The computing device of claim 1, wherein the at least one player information indicator comprises a buzz score indicator that displays a representation of a buzz score associated with the fantasy sports player.

6. The computing device of claim 5, wherein the buzz score is based upon a combination of a number of times the fantasy sports player has been added to a fantasy sports team, dropped from a fantasy sports team, and traded by a fantasy sports team.

7. The computing device of claim 1, wherein the action comprises one of adding the fantasy sports player to a user's fantasy sports team, dropping the fantasy sports player from the user's fantasy sports team, trading the fantasy sports player between the user's fantasy sports team and another fantasy sports team, or a combination thereof, wherein the user comprises a logged-in user.

8. The computing device of claim 1, wherein the interface further comprises a player type selector, wherein the player type selector is operable to display at least two player types, and further operable to receive selection of a selected type, wherein the interface is operable to display only players that correspond to the selected type.

9. The computing device of claim 1, wherein the interface displays information about the at least one player in response to user selection of the at least one player description component.

10. The computing device of claim 1, wherein the interface further comprises a note component visually associated with the at least one player description component, wherein the interface is operable to display the note component as an icon, and the interface is operable to receive and display information describing the fantasy sports player in response to user selection of the note component.

11. A computing device comprising:
a processor;
a display in communication with the processor for displaying an interface comprising player trends in an online fantasy sports game, the interface comprising:
a player table comprising at least one row, wherein the at least one row represents a corresponding fantasy sports player, and at least one column, wherein the at least one column comprises:
a player description column for displaying a description of the fantasy sports player, the description including a name of the fantasy sports player;
at least one player information indicator for displaying a representation of a statistical value associated with the fantasy sports player, the statistical value based on a number of times the fantasy sports player has been added to and dropped from fantasy sports teams in the fantasy sports game,
wherein the indication includes a plus sign when the statistical value comprises a net addition of the fantasy sports player to the fantasy sports teams, and the indication includes a minus sign when the statistical value comprises a net drop of the fantasy sports player from the fantasy sports teams; and
an action column that displays an action component for and displayed adjacent to the name of the fantasy sports player, wherein the action component causes an action to be performed with respect to the fantasy sports player in response to user selection of the action component,
wherein the interface periodically refreshes the representation of the statistical value to display a recent value of the statistical value.

12. The computing device of claim 11, wherein the statistical value is a combination of a number of times the fantasy sports player has been added to a fantasy sports team, dropped from a fantasy sports team, and traded from a fantasy sports team to another fantasy sports team.

13. The computing device of claim 11, wherein the action comprises adding the fantasy sports player to a user's team, dropping the fantasy sports player from the user's team, trading the fantasy sports player to another user's team, or a combination thereof, wherein the user comprises a uniquely identified user.

14. The computing device of claim 11, wherein the interface displays the at least one row in sorted order, wherein the at least one row is sorted by the statistical value.

15. The computing device of claim 11, wherein the description includes an actual sports team identifier of the fantasy sports player.

16. The computing device of claim 11, wherein the description includes a note component relating to the fantasy sports player.

17. The computing device of claim 16, wherein a user selection of the name or note component causes an information page relating to the fantasy sports player to be provided to the user.

18. A method for providing player trends for online fantasy sports games, the method comprising:
tracking, by a computing device, transactions made by a plurality of users regarding at least one fantasy sports player;
generating, by the computing device, a statistical value for the fantasy sports player based on the tracked transactions, the statistical value based on a number of times the fantasy sports player has been added to and dropped from fantasy sports teams in the fantasy sports game,
displaying an indication of the statistical value on a display, wherein the indication includes a plus sign when the statistical value comprises a net addition of the fantasy sports player to the fantasy sports teams, and the indication includes a minus sign when the statistical value comprises a net drop of the fantasy sports player from the fantasy sports teams;
displaying, by the computing device, a player identifier, an action component, and a representation of the statistical value for the fantasy sports player, wherein the action component for the fantasy sports player is displayed adjacent to the name of the fantasy sports player and causes an action to be performed with respect to the fantasy sports player in response to user selection of the action component; and
dynamically updating, by the computing device, the representation of the statistical value based on real-time transactions made by the plurality of users.

19. The method of claim 18, wherein tracking transactions comprises tracking the plurality of users adding, dropping, and trading the at least one fantasy sports player.

20. The method of claim 18, wherein generating the statistical value comprises computing an add/drop score.

21. The method of claim 18, wherein generating the statistical value comprises computing a buzz score.

22. The method of claim 18, further comprising uniquely identifying a user prior to displaying the player identifier and the representation of the statistical value.

23. The method of claim 22, further comprising displaying a representation of the user's possible future transaction of the at least one fantasy sports player based on the user identification.

24. The method of claim 23, wherein user selection of the representation of the user's possible future transaction displays a page configured to accept the user's new transaction relating to the at least one fantasy sports player.

25. A non-transitory computer readable storage medium tangibly storing program code thereon for execution by a processor, the program code comprising:
program code for generating a first statistical value associated with a fantasy sports player, the first statistical value based on a number of times the fantasy sports player has been added to and dropped from fantasy sports teams in the fantasy sports game,
program code for presenting an identifier of the fantasy sports player and the first statistical value,
wherein the presenting of the first statistical value includes a plus sign when the first statistical value comprises a net addition of the fantasy sports player to the fantasy sports teams, and the indication includes a minus sign when the first statistical value comprises a net drop of the fantasy sports player from the fantasy sports teams;
program code for presenting an action component for and displayed adjacent to the name of the fantasy sports player, wherein the action component enables a user to add, drop, or trade the fantasy sports player from the user's team; and
program code for updating the first statistical value in real-time.

26. The non-transitory computer readable storage medium of claim 25, wherein the first statistical value is based on at least one of a number of times the fantasy sports player has been added to a fantasy sports team, dropped from a fantasy sport team, and traded from a fantasy sports team to another fantasy sports team.

27. The non-transitory computer readable storage medium of claim 25, further comprising;
   program code for generating a second statistical value associated with another fantasy sports player; and
   program code for presenting an identifier of the another fantasy sports player and the second statistical value, wherein the presentation order for the fantasy sports player and the another fantasy sports player is based on a comparison of the first and second statistical values.

\* \* \* \* \*